UNITED STATES PATENT OFFICE 2,575,159

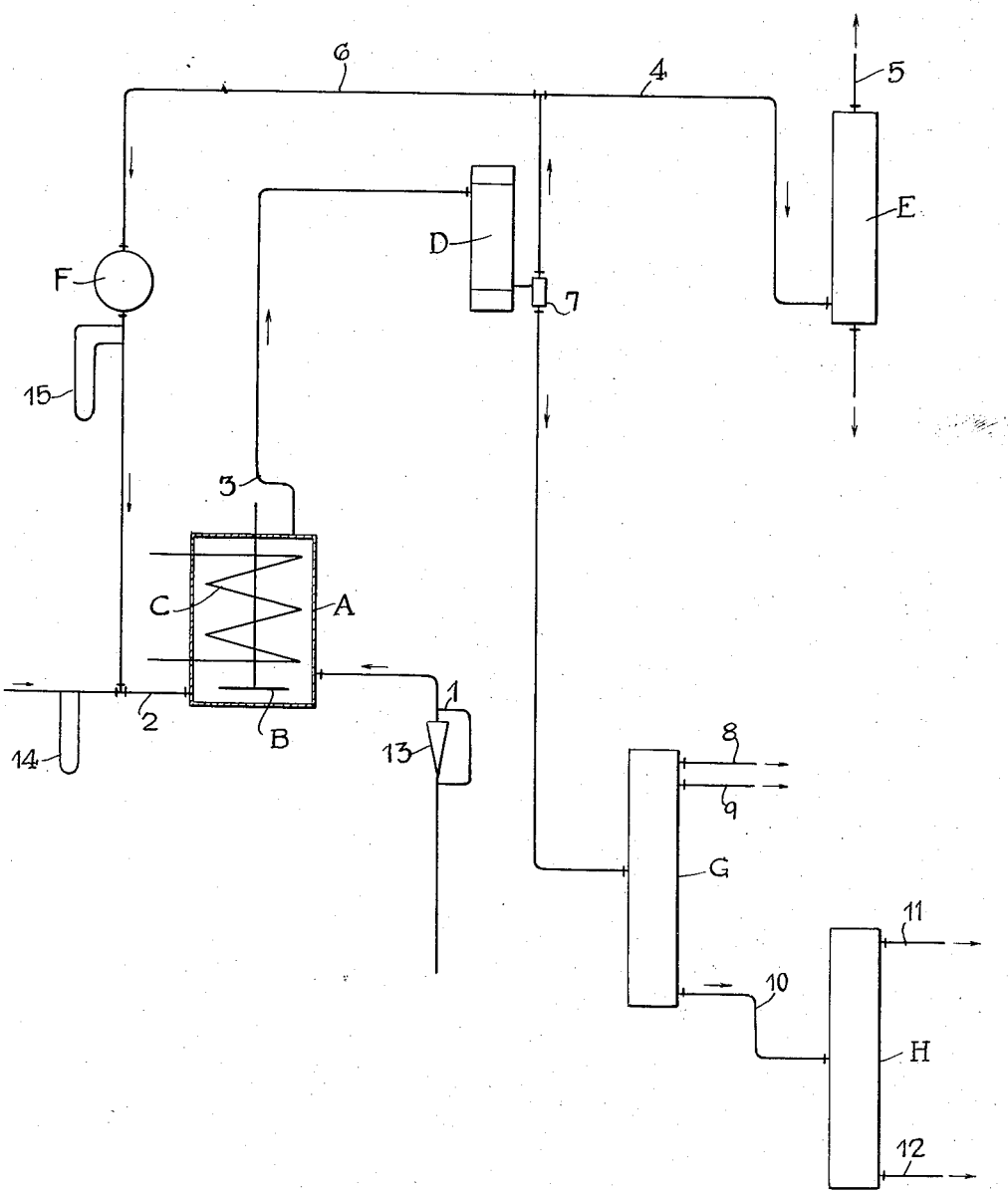

PROCESS FOR MANUFACTURING ANHYDRIDES

Pierre Chassaing, Rue Saint Jean, Melle, and Paul Biarnais, Le Coudray, Par Melle, France, assignors to Les Usines de Melle (Societe Anonyme), Saint-Leger-les-Melle, France, a corporation of France Application October 23, 1948, Serial No. 56,244
In France October 29, 1947

9 Claims. (Cl. 260—546)

The invention relates to a continuous process for the manufacture of lower aliphatic anhydrides having 4 to 8 atoms of carbon in their molecule, and it applies in a particularly interesting manner to the manufacture of acetic anhydride.

It has been proposed to prepare anhydrides by cracking the corresponding acids. More recently it has been proposed to obtain them simply by direct oxidation of the corresponding aldehyde in a liquid medium, by a technique similar to that which is used, for example, for the synthesis of acetic acid from acetaldehyde. For example, under certain conditions acetic anhydride constitutes an intermediate product in the series of reactions for producing acetic acid by oxidizing the aldehyde, involving production of peracetic acid.

Nevertheless, at the same time as the anhydride, water is also formed in an equimolecular quantity in relation to the anhydride, in accordance with the total reaction:

$$2CH_3CHO + O \rightarrow (CH_3CO)_2O + H_2O$$

The anhydride and the water thus present have naturally a tendency to combine, especially in the hot state, to form the acid, the terminal point of the reaction, this reaction following the kinetic laws of a bimolecular reaction of the second order. The anhydride, however, reacts with water to form the acid and methods that have been proposed for the manufacture of the anhydrides from the aldehydes have the object of avoiding this combination, so as to increase the yield of the reaction.

That is what led to the suggestion of working discontinuously, bringing about the oxidation of a charge of aldehyde very rapidly by means of oxygen under pressure and subjecting the product of the reaction to distillation even before the oxidation was complete. The drawbacks of such discontinuous methods are too well known to insist on them further, without counting the danger represented by the accumulation, for example, of acetaldehyde and oxygen in a space under pressure and in the presence of peracetic acid.

The suggestion has also been made to work in the presence of very small quantities of anhydride so as to reduce its concentration and consequently its combination with the water, but this way of proceeding causes high distillation costs, because it requires distillation of great quantities of acid.

Likewise with a view to diminishing the respective concentrations of the water and the anhydride, there has been recommended the use of inert diluents such as oxide-ethers or esters. In that case also, the necessity of using large proportions of the diluent leads to high distillation costs and likewise to losses of the diluent.

Finally, methods have been proposed which render it possible to withdraw the formed anhydride from the action of the water, either by solution in an inert diluent in the bath itself or by elimination of the water by means of absorbents; nevertheless, according to the opinion of the proposers themselves, the first method presents the major drawback of salting out the catalytic salts contained in the bath, while the difficulties of use and the cost of recovery of the absorbent substances practically forbid the use of the second method.

The principal object of the present invention is to provide a simple, efficient process which will overcome at least some of the disadvantages of the above-mentioned known processes.

The invention accordingly comprises the novel processes and steps of processes, specific embodiments of which are described hereinafter by way of example and in accordance with which we now prefer to practice the invention.

We have discovered in accordance with our invention a process which is preferably continuous, which on the one hand avoids the use of any adjuvant of the bath (diluent, absorbent, etc.) and on the other hand makes it possible to obtain both a high yield of anhydride and a considerable reduction in the cost of separation of the anhydride from the reaction mixture.

In carrying out the process in accordance with our invention for the production of lower aliphatic anhydrides of 4 to 8 carbon atoms, we introduce into a bath aldehyde capable of generating the desired anhydride and an oxygen-containing gas, together with its corresponding acid and an anhydride catalyst which is substantially non-volatile under the conditions of reaction and which is a metal such as cobalt, nickel, copper, silver and vanadium, or like metal, combined with the acid corresponding to the desired anhydride. The anhydride is present in predominating amount. The oxygen-containing gas may be air or mixtures of air and oxygen, with or without inert gases such as carbon dioxide, hydrocarbons, etc. We react the aldehyde and oxygen-containing gas at a temperature suitable for anhydrization and remove gas containing the desired anhydride from the bath. The process is preferably conducted continuously.

When one proceeds in this way, one immediately secures a twofold advantage, as follows: In the first place, in view of the fact that the gas issuing from the bath and impoverished in oxygen charges itself with vapors of the constituents of this bath in proportions dependent both upon the relative volatility and upon the respective concentrations of the constituents, it is possible, with a moderate delivery of gas low in oxygen, to obtain in the bath a concentration of water that is sufficiently low to limit hydrolysis of the anhydride to a slight amount and to assure high yields of anhydride.

In the second place, the gas charges itself with a high proportion of vapors of anhydride, which are evidently free from catalyst, so that on the one hand the isolation of this anhydride does not require its separation from the catalyst, which separation is difficult, and on the other hand the catalyst, being no longer extracted from the bath, may serve in it indefinitely for the reaction, a circumstance which makes possible an additional economy in comparison with other processes.

In order to carry along practically all the water in proportion to its formation, it is necessary to provide, on the one hand, a sufficiently great richness of the bath in anhydride, and, on the other hand, a sufficiently high delivery of gas. In this respect it has proved to be advantageous to work with baths containing about 75% of anhydride or more. As regards the delivery of gas escaping from the bath, it must for this purpose be at least 1.2 cubic meters and preferably about 1.5 cubic meters or more per hour per liter of bath.

The process may, moreover, be carried out in different ways according to the anhydride which it is desired to obtain.

If the delivery of gas has been calculated in such a way as to assure a satisfactory entrainment of the water, the rate of entrainment of the anhydride is not the same in all cases: it is evidently less in the case of a relatively heavy anhydride such as butyric anhydride than, for example, in the case of acetic anhydride.

Then, if the entrainment of the anhydride is less than its production, this anhydride may be permitted to accumulate in the bath and the reaction may be interrupted when the volume of the bath has become prohibitive. Nevertheless, for this discontinuous method of operation it is preferable to substitute a continuous operation and, in accordance with the invention, we force the supply of gas sufficiently to insure, at the same time as that of the water, the entrainment of the anhydride in proportion to its formation; in this way one insures a state of operation in which the volume of the bath and the concentrations in the bath are practically invariable. On the other hand, if the entrainment of the anhydride is greater than its production for a gas supply which is fixed in such a way as to insure a satisfactory entrainment of the water, it is possible, in order to regulate the constancy of volume of the bath, to introduce into it anhydride and anhydrous acid, particularly of those which can be obtained from the vapors carried along from the bath by the gas. Such a regulation can be imposed when, desiring to attain a very high yield of anhydride and consequently having to maintain in the bath a very low concentration of water, one is led to force the supply of gas to the point of removing from the bath more anhydride and acid than is produced thereof in the same time.

One brings about the oxidation reaction by adopting preferably as the temperature of anhydrization about 30° to 100° C., and, more specifically, about 40° to 70° C. It is convenient to operate at atmospheric pressure, but one may likewise operate at a slightly higher pressure; nevertheless it is not advantageous to increase the latter too greatly, for the coefficient of entrainment of the water, in the vapor state, diminishes in proportion as the pressure increases. It is particularly advantageous not to exceed two to three kilograms of pressure per cubic centimeter in carrying out the process.

As catalysts one uses preferably salts of metals (such as cobalt, nickel, copper, silver, vanadium, etc.) and of the acid corresponding to the anhydride that is to be obtained, these salts being introduced in solid form and used singly or in mixture, at concentrations which may vary from 0.1 to 1% and preferably from 0.2 to 0.4% by weight of the bath.

The oxidation gas may be oxygen mixed with any other gas which does not react with the substances participating in the reaction; in particular one may use air, whether it is natural, enriched, or impoverished in oxygen, but one may also use, in mixture with oxygen or with air, hydrocarbons, such as methane or ethane, carbon dioxide, etc. In accordance with the invention one may, in particular, recover a portion of the gases after passage into the bath and cooling and reintroduce them into the latter in admixture with fresh oxidation gas. In this manner one reduces the quantity of gases which are rejected to the atmosphere and from which it is necessary to recover, for example by washing, the vapors that have been carried along. More particularly it is possible to use pure oxygen; one mixes it, in that case, before its introduction into the bath, with any gas that is devoid of action upon the substances participating in the reaction, and one recovers this auxiliary gas in its entirety, once it has been freed from the vapors which it has carried along, to send it back into the bath, thus constituting a closed circuit in which it is unnecessary to provide a gas washer and which receives only oxygen.

The gases and vapors escaping from the bath are preferably subjected to a cooling, advantageously at a temperature which does not perceptibly exceed 10° C.; the liquid that is thus obtained contains water and anhydride in the presence of one another, but it is cold and the risks of hydroylsis are greatly diminished. Nevertheless it is advantageous to dehydrate it as rapidly as possible, which one can accomplish by distillation in the presence of an auxiliary substance that is an entrainer of water, such as ethyl acetate; there remains an anhydrous mixture of acid and anhydride which one can separate into its constituents by simple distillation. The invention, moreover, is not limited to these methods of special separation of the constituents of the hydrated mixture.

The invention is particularly interesting for the manufacture of acetic anhydride by reason of the considerable importance of this substance, although it is not limited to this application and may be employed for making propionic and butyric anhydrides.

The invention may be practiced advantageously in the following manner and by operating in apparatus as shown in the annexed diagrammatic drawing which is not to be considered as limiting the invention.

A designates a cylindrical chamber in which the oxidation is effected and which is supplied, on the one hand, with aldehyde by way of the piping 1 having a rotameter or counter 13, and on the other hand by way of the piping 2 with fresh air and with air which is impoverished in oxygen and which has already served in the oxidation reaction.

By means of any mechanical contrivance B one insures a fine distribution of the gases within the liquid, and one maintains the temperature of the bath by cooling by means of a coil C supplied with cold water.

The gases escape from the reaction at 3 and, carrying along the vapors of the products with which they have saturated themselves in their passage, are conducted to a condenser D, where they are suitably cooled. At their egress from the condenser a portion of the gases is evacuated by way of 4 and 5 after passage into recovery member E in which they are freed, for example by washing with water, from the vapors of aldehyde and acid which they still contain, while another portion is sent back, by means of a channel 6 and a blower F, to the base of the container A. The pipes 2 and 6 are equipped with output meters 14 and 15.

The cold liquid which flows out of the condenser D at 7 contains anhydride, a little acid, water, and small quantities of aldehyde; it is immediately sent into a column G charged with ethyl acetate, in which column it may be treated in accordance with the process of French Patent No. 778,748 of December 12, 1933, whereby the mixture of acid and anhydride is separated from the water.

The aldehyde is separated at the top at 8 and returns to the reaction. The water is drawn off at 9. This manner of proceeding reduces the hydrolysis to the minimum, practically to less than 5% of the anhydride contained in the liquid that is to be distilled. The anhydrous mixture of acid and anhydride which flows out at 10, at the base of the column G, is separated by distillation in a column H into acid and anhydride, which one draws off at 11 and 12 respectively. In treating acetaldehyde one thus succeeds in obtaining yields of pure acetic anhydride, after distillation, of from 50 to 80% of the oxidized aldehyde, the remainder being converted into acetic acid.

As has already been pointed out, the yield is better in proportion as the gas recycling is more considerable, and, if one increases the latter one may be led to return into the bath a portion of the manufactured anhydride, in mixture or not in mixture with dehydrated acid, so as to avoid a diminution of volume of the bath; one may even use for this a portion of the anhydrous mixture drawn off at the base of the column G.

Examples

1. Into an oxidation chamber equipped with a stirrer device making possible an intimate contact between gas and liquid, one introduces 240 liters of acetic anhydride, 60 liters of anhydrous acetic acid, and 900 grams of a mixture, in equal parts, of copper acetate and cobalt acetate, which is of course non-volatile under the reaction conditions.

One heats to 50° C. under atmospheric pressure and one causes to arrive in continuous supply 50 kgs. of liquid ethanal or acetaldehyde and 150 cubic meters of fresh air per hour. At the end of a short time the oxidation reaction is started and it is necessary to cool in order to keep the temperature at 50° C.

The gases that escape from the container are cooled to a temperature below 10° C., and the vapors with which they were saturated are condensed. A portion of the cooled gases leaving the condensation chamber is caught and sent back into the oxidation chamber in admixture with fresh air at the rate of 300 cubic meters per hour of gas for 150 cubic meters of fresh air.

It is ascertained that, under these conditions, the volume of the bath remains constant and that its composition is established at the equilibrium as follows:

|  | Per cent |
|---|---|
| Acetic anhydride | 78 |
| Acetic acid | 18.5 |
| Acetaldehyde | 2.2 |
| Water | 1.3 |

The liquid that is collected at the outlet of the condenser possesses the following composition:

|  | Per cent |
|---|---|
| Acetic anhydride | 47 |
| Acetic acid | 38.5 |
| Acetaldehyde | 7 |
| Water | 7.5 |

The liquid so condensed is passed into a column charged with ethyl acetate and from the top of which the aldehyde is separated, water being drawn off at a slightly lower point in the column, both in a known manner. The anhydrous mixture of acid and anhydride flows out of the base of this column and is then separated into acid and anhydride by distillation in a known manner.

A yield of 59% of acetic anhydride is obtained.

2. One operates under the conditions and in the apparatus described above in Example 1, but one increases the quantity of gas returned into the bath to 450 cubic meters per hour and one introduces into the oxidation chamber, at the start, 270 liters of acetic anhydride, 30 liters of anhydrous acetic acid, and 900 grams of catalyst. It is ascertained that, under these conditions, the level of the bath declines, and in order to keep it constant one is led to add to it in continuous supply a mixture of acetic acid and acetic anhydride in the respective proportions in which they are present in the condensate.

Under these conditions it is ascertained that the composition of the bath establishes itself at the end of a certain time at the equilibrium as follows:

|  | Per cent |
|---|---|
| Anhydride | 92.3 |
| Acid | 3.3 |
| Water | 1.1 |
| Acetaldehyde | 2.4 |

The condensed liquid issuing from the condenser has the following composition at the equilibrium:

| | Per cent |
|---|---|
| Anhydride | 65.6 |
| Acid | 16.9 |
| Water | 11. |
| Acetaldehyde | 6.5 |

The separation of this condensate is effected similarly to that given under Example 1.

The yield calculated on this composition is 82% of anhydride.

Instead of the mixtures of metal salts mentioned in the above examples, either of these metals may be used separately in the same proportions as indicated. In addition, any of the other metals, especially vanadium or nickel, either singly or in mixture with each other or with either copper and/or cobalt and/or silver may be employed in carrying out the above processes in Examples 1 and 2 employing about the same proportions as these indicated.

Instead of air, oxygen diluted with carbon dioxide may be employed in the above examples.

What we claim is:

1. A process for the production of saturated fatty acid anhydrides having from four to eight carbon atoms which comprises, introducing an aldehyde capable of generating said anhydride, and an oxygen-containing gas, into a bath substantially consisting of at least 75% by weight of the desired anhydride, its corresponding acid and a catalyst which consists of at least one salt of a metal selected from the group consisting of vanadium, cobalt, nickel, copper and silver, combined with the acid corresponding to the desired anhydride, said bath being maintained at a temperature of from about 30° C. to about 100° C., and removing gas containing the desired anhydride from the bath.

2. A process for the production of saturated fatty acid anhydrides having from four to eight carbon atoms which comprises, continuously introducing into a bath aldehyde capable of generating said anhydride and an oxygen-containing gas, said bath consisting of at least 75% by weight of the desired anhydride together with small amounts of the corresponding acid and an anhydride catalyst which consists of at least one salt of a metal selected from the group consisting of vanadium, cobalt, nickel, copper and silver, combined with the acid corresponding to the desired anhydride, continuously reacting the aldehyde and oxygen-containing gas at a temperature of about 30° C. to about 100° C., and continuously removing gas containing the desired anhydride from the bath at a rate to remove substantially all of the anhydride formed.

3. A process for the production of saturated fatty acid anhydrides having from four to eight carbon atoms which comprises, introducing into a bath aldehyde capable of generating said anhydride and an oxygen-containing gas, said bath consisting of at least 75% by weight of the desired anhydride together with small amounts of the corresponding acid and an anhydride catalyst which consists of at least one salt of a metal selected from the group consisting of vanadium, cobalt, nickel, copper and silver, combined with the acid corresponding to the desired anhydride, reacting the aldehyde and oxygen-containing gas at a temperature of about 30° C. to about 100° C., and removing gas containing the desired anhydride at the rate of about 1.2 cubic meters to about 1.5 cubic meters per hour per liter of the bath.

4. A process for the production of saturated fatty acid anhydrides having from four to eight carbon atoms which comprises, continuously introducing into a bath aldehyde capable of generating said anhydride and an oxygen-containing gas, said bath consisting of at least 75% by weight of the desired anhydride together with small amounts of the corresponding acid and an anhydride catalyst which consists of at least one salt of a metal selected from the group consisting of vanadium, cobalt, nickel, copper and silver, combined with the acid corresponding to the desired anhydride, continuously reacting the aldehyde and oxygen-containing gas at a temperature of about 30° C. to about 100° C., and continuously removing gas containing the desired anhydride from the bath while adding at least one of the components, acid and anhydride, to the bath to maintain constant at least one of its characteristics, namely, its volume and composition.

5. A process according to claim 1 in which the catalyst is present in the proportion of about 0.1% to about 1% by weight of the bath.

6. A process according to claim 1 in which the oxygen-containing gas is selected from the group consisting of air and oxygen and each of said gases mixed with an inert gas.

7. A process for the production of saturated fatty acid anhydrides having from four to eight carbon atoms which comprises, continuously introducing into a bath aldehyde capable of generating said anhydride and an oxygen-containing gas, said bath consisting of at least 75% by weight of the desired anhydride together with small amounts of the corresponding acid and a solid anhydride catalyst which consists of at least one salt of a metal selected from the group consisting of vanadium, cobalt, nickel, copper and silver, combined with the acid corresponding to the desired anhydride, continuously reacting the aldehyde and oxygen-containing gas at a temperature of about 30° C. to about 100° C., removing gas containing the desired anhydride from the bath, separating the anhydride and other constituents from the gas, returning at least part of the gases to the bath, and supplying oxygen and further aldehyde to the bath along with such gas.

8. A process for the production of saturated fatty acid anhydrides having from four to eight carbon atoms which comprises, continuously introducing into a bath aldehyde capable of generating said anhydride and an oxygen-containing gas, said bath consisting of at least 75% by weight of the desired anhydride together with small amounts of the corresponding acid and a solid anhydride catalyst which consists of at least one salt of a metal selected from the group consisting of vanadium, cobalt, nickel, copper and silver, combined with the acid corresponding to the desired anhydride, continuously reacting the aldehyde and oxygen-containing gas at a temperature of about 30° C. to about 100° C., removing a mixture of gas containing said anhydride, acid, aldehyde and water, cooling the gas to a temperature of at least 10° C., condensing substances other than the gas, combining therewith a water entrainer, and separating the anhydride from the remaining constituents.

9. A process for producing acetic anhydride, which comprises preparing a mixture consisting of at least 75% by weight of acetic anhydride, acetic acid and a mixture of copper acetate and cobalt acetate as catalyst, continuously introducing into the bath acetaldehyde and a current of air and reacting the said acetaldehyde and air at a temperature of about 40° to about 50° C., leading a stream of gas from the bath containing acetic anhydride, acetic acid, a small quantity of acetaldehyde and water vapor, cooling the gas, and continuously separating acetic anhydride from a portion thereof, while continuously returning a portion to the bath along with a further quantity of acetaldehyde and air.

PIERRE CHASSAING.
PAUL BIARNAIS.

REFERENCES CITED

The following references are of record in the file of this patent:

UNITED STATES PATENTS

| Number | Name | Date |
|---|---|---|
| 2,259,895 | Koenig | Oct. 21, 1941 |
| 2,293,104 | Bludworth | Aug. 18, 1942 |
| 2,367,501 | Hull et al. | Jan. 16, 1945 |